United States Patent
Sekine et al.

(10) Patent No.: US 9,205,746 B2
(45) Date of Patent: Dec. 8, 2015

(54) ELECTRIC ASSIST CART

(71) Applicant: KAYABA INDUSTRY CO., LTD., Minato-ku, Tokyo (JP)

(72) Inventors: Shinichi Sekine, Fukaya (JP); Osamu Miyatani, Kani (JP)

(73) Assignee: KAYABA INDUSTRY CO., LTD., Tokyo (JP)

(*) Notice: Subject to any disclaimer, the term of this patent is extended or adjusted under 35 U.S.C. 154(b) by 85 days.

(21) Appl. No.: 14/349,779

(22) PCT Filed: Oct. 3, 2012

(86) PCT No.: PCT/JP2012/075687
§ 371 (c)(1),
(2) Date: Apr. 4, 2014

(87) PCT Pub. No.: WO2013/054714
PCT Pub. Date: Apr. 18, 2013

(65) Prior Publication Data
US 2014/0246261 A1    Sep. 4, 2014

(30) Foreign Application Priority Data

Oct. 13, 2011  (JP) ................................. 2011-225975

(51) Int. Cl.
*B60L 7/26* (2006.01)
*B60L 3/00* (2006.01)
(Continued)

(52) U.S. Cl.
CPC . *B60L 3/00* (2013.01); *B60L 1/003* (2013.01); *B60L 3/0061* (2013.01); *B60L 3/0084* (2013.01); *B60L 3/04* (2013.01); *B60L 7/12* (2013.01);
(Continued)

(58) Field of Classification Search
CPC ........ B62B 3/00; B62B 5/0033; B62B 3/001; B60L 11/1805; B60L 3/0084; B60L 7/12; B60L 7/26
See application file for complete search history.

(56) References Cited

U.S. PATENT DOCUMENTS

| | | | |
|---|---|---|---|
| 3,211,250 A * | 10/1965 | Wood | 180/273 |
| 2013/0173099 A1 * | 7/2013 | Takagi | 701/22 |
| 2013/0173100 A1 * | 7/2013 | Takagi | 701/22 |

FOREIGN PATENT DOCUMENTS

| | | |
|---|---|---|
| JP | 09-056015 A | 2/1997 |
| JP | 09-109894 A | 4/1997 |

(Continued)

OTHER PUBLICATIONS

International Search Report mailed Dec. 18, 2012, in corresponding International Application No. PCT/JP2012/075687.

*Primary Examiner* — Faye M Fleming
(74) *Attorney, Agent, or Firm* — Hauptman Ham, LLP

(57) ABSTRACT

An electric assist cart includes: a drive wheel provided in a body frame; a control handle used by an operator to input a driving force to the body frame; a torque sensor that detects a driving torque applied to the body frame from the control handle; a controller that computes an assisting force applied to the drive wheel based on the driving torque; an electric motor that applies the assisting force to the drive wheel; a brake that brakes the drive wheel and switches from a braking state to an unbraking state when a predetermined electric current flows; and a brake release switch manipulated by an operator to allow the controller to instruct the predetermined electric current to flow to the brake, wherein the controller maintains the braking state of the brake even when the brake release switch is manipulated without turning on power, and power is then turned on.

7 Claims, 6 Drawing Sheets

(51) Int. Cl.
*B62B 3/00* (2006.01)
*B62B 5/04* (2006.01)
*B60L 3/04* (2006.01)
*B60L 7/12* (2006.01)
*B60L 11/18* (2006.01)
*B60L 15/20* (2006.01)
*B62B 5/00* (2006.01)
*B60L 1/00* (2006.01)

(52) U.S. Cl.
CPC ............... *B60L 7/26* (2013.01); *B60L 11/1805* (2013.01); *B60L 15/2009* (2013.01); *B60L 15/2036* (2013.01); *B62B 3/00* (2013.01); *B62B 3/001* (2013.01); *B62B 5/0033* (2013.01); *B62B 5/0073* (2013.01); *B62B 5/04* (2013.01); *B60L 2200/30* (2013.01); *B60L 2220/46* (2013.01); *B60L 2240/423* (2013.01); *B60L 2250/16* (2013.01); *B60L 2270/145* (2013.01); *B62B 2203/10* (2013.01); *B62B 2301/20* (2013.01); *Y02T 10/642* (2013.01); *Y02T 10/7005* (2013.01); *Y02T 10/7275* (2013.01)

(56) References Cited

FOREIGN PATENT DOCUMENTS

| | | | |
|---|---|---|---|
| JP | 10-045000 A | 2/1998 | |
| JP | 2000-210340 A | 8/2000 | |
| JP | 2000-287311 A | 10/2000 | |
| JP | 2002-067970 A | 3/2002 | |
| JP | 2004-113375 A | 4/2004 | |
| JP | 2005-231557 A | 9/2005 | |
| JP | 2006-137391 A | 6/2006 | |
| JP | 2006-213243 A | 8/2006 | |
| JP | 2006-290319 A | 10/2006 | |
| JP | 2012-166748 A | 9/2012 | |
| JP | 2012249365 A | * 12/2012 | .................. 701/22 |

* cited by examiner

ELECTRIC ASSIST CART

RELATED APPLICATIONS

The present application is a National Phase of International Application Number PCT/JP2012/075687, filed Oct. 3, 2012, which claims priority to Japanese Application Number 2011-225975, filed Oct. 13, 2011.

TECHNICAL FIELD

This invention relates to an electric assist cart in which a driving force is assisted by an electric motor.

BACKGROUND ART

In general, when a heavy burden is loaded on a handcart used in a factory or the like, an operator necessarily pushes the handcart with a strong force at the start of delivery. This is a hard work.

As a countermeasure for this problem, JP 2006-290319 A proposes an electric assist hand-push cart in which an operator's force applied to the handcart is detected, and an assistant power corresponding to the human power is applied from an electric motor. In this electric assist hand-push cart, a force applied by an operator in forward and backward movements is assisted depending on the handling of a hand-push frame body from an operator.

In addition, in JP 2002-67970 A, there is disclosed a cargo handling vehicle having an electronic brake capable of switching between a braking state and an unbraking state. In this cargo handling vehicle, the electronic brake can switch between the braking state and the unbraking state using a button switch pressed by an operator.

SUMMARY OF INVENTION

However, in the electronic brake disclosed in JP 2002-67970 A, when a manipulation is performed for switching the electronic brake to the unbraking state without turning on power, and power is then turned on, the electronic brake may simultaneously switch to the unbraking state. If this electronic brake is applied to the cart disclosed in JP 2006-290319 A, for example, when a cart is parked on a sloped road, the cart may slide down as soon as power is turned on.

It is therefore an object of this invention to improve safety of the electric assist cart.

According to one aspect of this invention, an electric assist cart that can travel by applying an assisting force in addition to a driving force applied by an operator, includes: a body frame where a burden can be loaded; a drive wheel provided in the body frame; a handling portion pushed and handled by an operator to input a driving force to the body frame; a torque detection part that is configured to detect a driving torque applied to the body frame by pushing and handling the handling portion; a controller that is configured to compute an assisting force applied to the drive wheel based on the driving torque detected by the torque detection part; an electric motor that is configured to apply the assisting force computed by the controller to the drive wheel; a brake that is configured to brake the drive wheel and switches from a braking state to an unbraking state when a predetermined electric current flows; and a brake release switch manipulated by an operator to allow the controller to instruct the predetermined electric current to flow to the brake. The controller maintains the braking state of the brake even when the brake release switch is manipulated without turning on power, and power is then turned on.

The details as well as other features and advantages of this invention are set forth in the remainder of the specification and are shown in the accompanying drawings.

DESCRIPTION OF EMBODIMENTS

Figure 1:
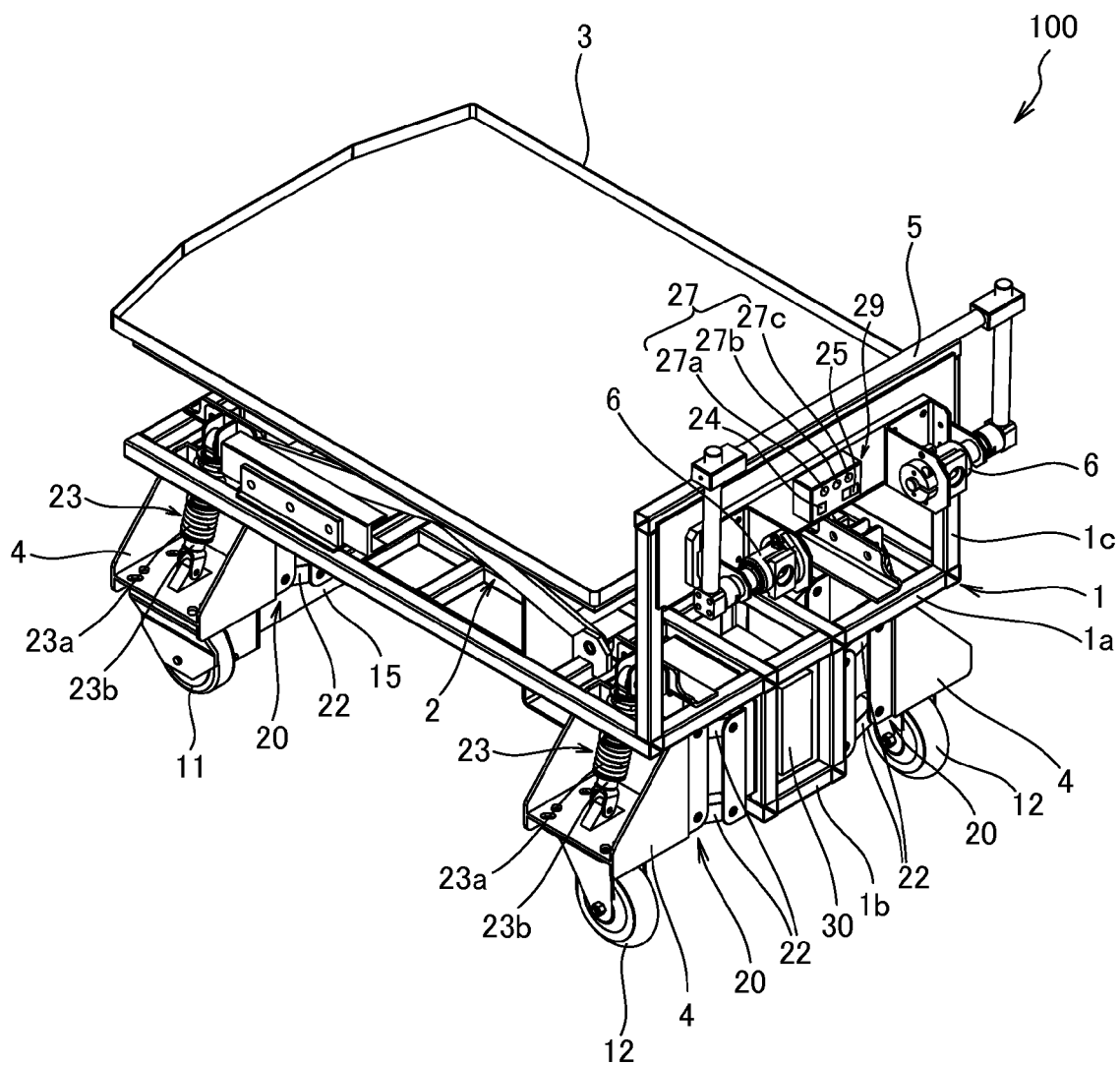
FIG. 1 is a perspective view illustrating an electric assist cart according to an embodiment of the present invention.

Hereinafter, an embodiment of the present invention will be described with reference to the accompanying drawings.

First, an electric assist cart 100 according to an embodiment of the invention will be described with reference to FIGS. 1 to 4.

The electric assist cart 100 is used to carry a heavy burden, for example, in a factory or the like. The electric assist cart 100 travels by virtue of an assisting force caused by rotation of an electric motor 15 described below in addition to a driving force applied from an operator.

The electric assist cart 100 includes a body frame 1, a deck 3 provided on the body frame 1 to load a burden, a control handle 5 as a handling portion by which a driving force can be input from both left and right portions of the body frame 1, a pair of drive wheels 11 provided in both left and right sides of the body frame 1 with an interval in a travel direction, and a pair of universal wheels 12 installed in the body frame 1 in rear of the drive wheels 11. The drive wheels 11 are front wheels of the electric assist cart 100, and the universal wheels 12 are rear wheels of the electric assist cart 100.

The body frame 1 is a frame obtained by combining rectangular pipes. The body frame 1 includes a planar portion 1a where a burden is loaded using a deck 3, a lower projecting portion 1b projecting in the lower side of the planar portion 1a, and an erected portion 1c erected on the upper portion of the rear end of the planar portion 1a.

The deck 3 is a rimmed flat plate provided to cover the top of the planar portion 1a of the body frame 1. A burden is directly loaded on the deck 3. The deck 3 may be an unrimmed flat plate. In addition, instead of the deck 3, a roller conveyor may be installed on the body frame 1, and a burden may be loaded using the roller conveyor.

Figure 2:
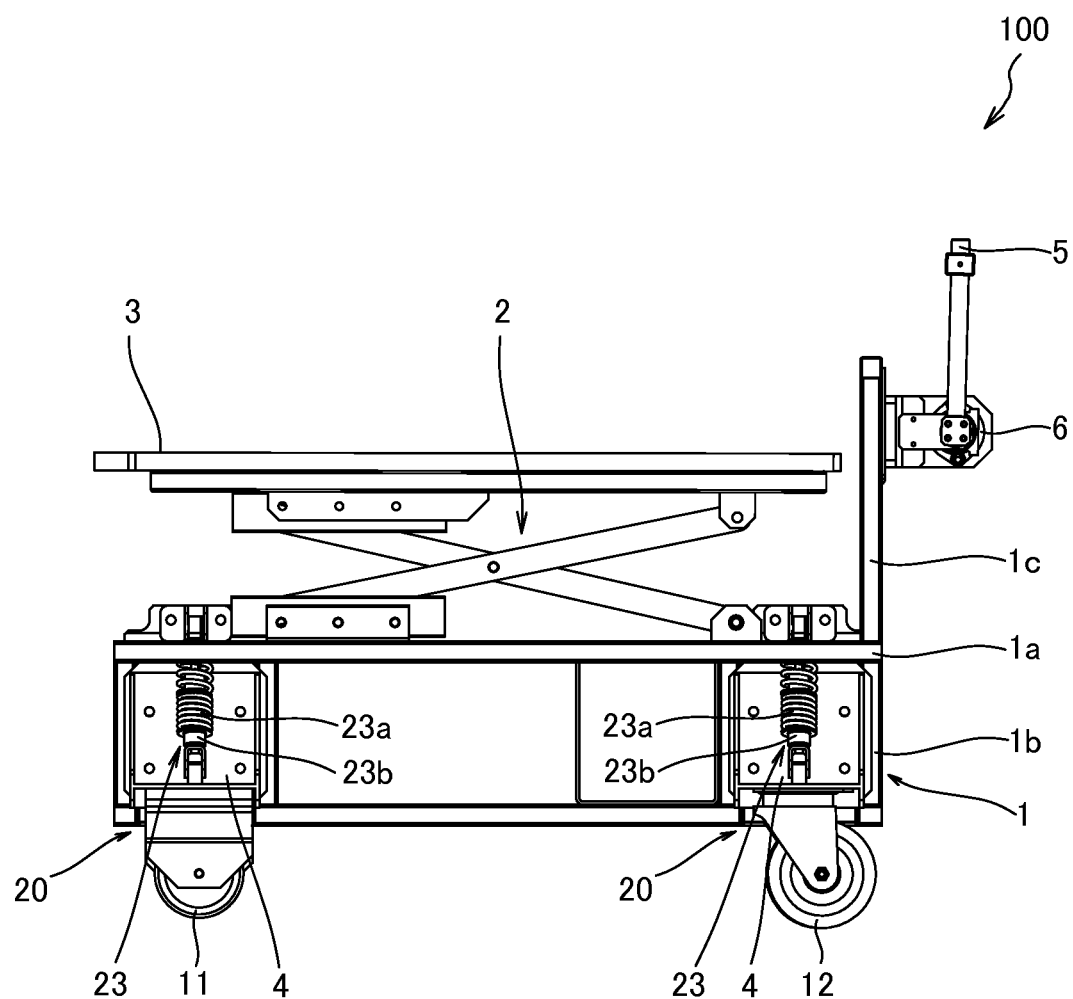
FIG. 2 is a side view of FIG. 1.

As illustrated in FIG. 2, a lift unit 2 is provided between the body frame 1 and the deck 3. The lift unit 2 lifts or lowers the deck 3 against the body frame 1 using an electric lift cylinder 2a (refer to FIG. 4). For example, when a heavy burden is loaded on the deck 3, and the body frame 1 sinks to the drive wheel 11 and the universal wheel 12 by means of a suspension unit 20 described below, the lift unit 2 may lift the deck 3 to constantly maintain a height of the deck 3 from the road surface.

The electric lift cylinder 2a is electrically connected to a controller 30 described below and expands or contracts in response to an instruction signal from the controller 30. The electric lift cylinder 2a is an electric hydraulic linear actuator provided with a hydraulic pump driven by a motor so as to expand or contract by a pressure of the hydraulic fluid discharged from the hydraulic pump.

The control handle 5 is a reversed U-shaped handle pushed and handled by an operator as illustrated in FIG. 1. Both left and right ends of the control handle 5 are connected to the erected portion 1c of the body frame 1. As a result, a driving force input when an operator handles the control handle 5 is transmitted to the body frame 1.

The drive wheel 11 is a small wheel unturnably provided in a longitudinal direction of the body frame 1. A pair of left and right drive wheels 11 is provided in the vicinity of the front end of the body frame 1. The drive wheels 11 are fixed to the lower projecting portion 1b of the body frame 1 movably upward and downward.

The universal wheel 12 is a small wheel directed to a movement direction at all times when the cart travels. The universal wheel 12 turns by a frictional resistance with the road surface to steer the cart toward a movement direction. The universal wheel 12 is fixed to the lower projecting portion 1b of the body frame 1 movably upward and downward.

The electric assist cart 100 includes four subsidiary frames 4 movable upward and downward against the body frame 1 and a suspension unit 20 that suspends the driving wheels 11 and the universal wheels 12 from the subsidiary frame 4.

Four subsidiary frames 4 are provided for a pair of drive wheels 11 and a pair of universal wheels 12. Two subsidiary frames 4 are arranged in each of the left and right sides of the body frame 1. The drive wheel 11 or the universal wheel 12 is rotatably fixed to the lower surface of each subsidiary frame 4.

The suspension unit 20 includes four suspension arms 22 for supporting the left and right subsidiary frames 4 of the body frame 1 movably upward and downward and spring dampers 23 provided between the body frame 1 and the left and right subsidiary frames 4.

Four suspension arms 22 are provided for a single subsidiary frame 4. Both ends of each suspension arm 22 are connected to the body frame 1 and the left and right subsidiary frames 4 pivotably around a horizontal axis, so that the suspension arm 22 serves as a parallel link mechanism that supports the subsidiary frame 4 against the body frame 1 to allow for parallel displacement.

As a result, even when the subsidiary frame 4 is lifted or lowered against the body frame 1, a posture of the subsidiary frame 4 does not change, and a positional relationship (alignment) between the drive wheel 11 and the universal wheel 12 is maintained constantly. Therefore, even when the subsidiary frame 4 is lifted or lowered, it is possible to suppress one of the drive wheel 11 and the universal wheel 12 from floating from the road surface.

The spring damper 23 absorbs or dampens vertical vibration in the drive wheel 11 and the universal wheel 12 caused by an unprepared road surface or the like and suppresses the vibration from the road surface from being transmitted to the body frame 1. The spring damper 23 has a coil spring 23a and a damper 23b. The spring damper 23 expands or contracts as the subsidiary frame 4 is lifted or lowered.

The coil spring 23a supports a load applied to the subsidiary frame 4 by virtue of its spring force. The coil spring 23a expands or contracts as the subsidiary frame 4 is lifted or lowered.

A hydraulic fluid filled in the damper 23b passes through a damping valve (not illustrated) as the coil spring 23a expands or contracts, so that the damper 23b generates a damping force for suppressing vibration of the subsidiary frame 4.

It is noted that a configuration of the suspension unit 20 is not limited to that described above, but other configurations may be possible if a posture of the subsidiary frame 4 against the body frame 1 is maintained.

The electric assist cart 100 includes: a torque sensor 6 serving as a pair of torque detection parts for detecting a driving torque applied to each of the left and right portions of the body frame 1 as the control handle 5 is pushed and handled; a controller 30 that computes the assisting force applied to the drive wheel 11 depending on a driving torque detected by the torque sensor 6; a pair of electric motors 15 for applying an assisting force computed by the controller 30 to each drive wheel 11; a pair of brakes 16 that brakes rotation of each drive wheel 11; and a console 29 provided with various switches that can be manipulated by an operator.

The torque sensor 6 is electrically connected to the controller 30 and outputs an electric signal corresponding to the detected driving torque to the controller 30. The torque sensor 6 includes: a torsion bar (not illustrated) connected between the control handle 5 and the body frame 1 and twisted by the driving force input from the handling portion while the driving force is transmitted to the body frame 1; and a potentiometer (not illustrated) that outputs an electric signal corresponding to the torsion of the torsion bar. The torque sensor 6 detects the driving torque based on the torsion of the torsion bar. By changing the torsion bar provided in the torque sensor 6, it may also be possible to change a handling sense of an operator depending on a live load of the cart without changing other members.

Figure 3:
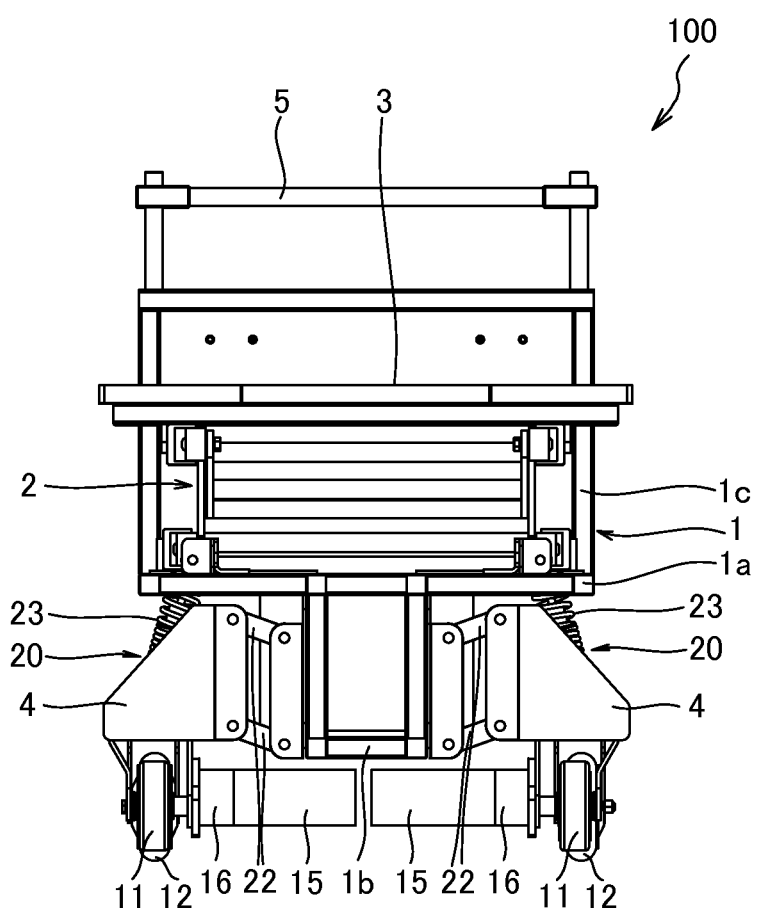
FIG. 3 is a front view of FIG. 1.

The electric motor 15 is electrically connected to the controller 30 and is rotated depending on the electric signal input from the controller 30. As illustrated in FIG. 3, the electric motor 15 is arranged inside the drive wheel 11 to apply an assisting force to the driving wheel 11. The left and right electric motors 15 are coaxially provided and arranged in series between a pair of the drive wheels 11. The electric motor 15 has a transmission (not illustrated) that transmits rotation to the drive wheel 11 by decelerating the rotation.

The brake 16 is arranged between an output shaft of the electric motor 15 and the drive wheel 11. The brake 16 has a brake solenoid 16a (refer to FIG. 4) that can switch between a braking state and an unbraking state. When the brake 16 switches to the braking state, the brake 16 fixes the drive wheel 11 to a rotation disable state.

The brake solenoid 16a is electrically connected to the controller 30 and switches depending on a predetermined electric current supplied in response to an instruction from the controller 30. While no predetermined electric current flows to the brake solenoid 16a, the brake 16 maintains the drive wheel 11 in the braking state. That is, while no power is applied to the electric assist cart 100, the drive wheel 11 is maintained in the braking state by the brake 16.

Meanwhile, when a predetermined electric current flows to the brake solenoid 16a, the brake 16 switches the drive wheel 11 to the unbraking state. This predetermined electric current has a magnitude of an excitation current capable of switching the brake solenoid 16a. In addition, the brake solenoid 16a feeds back the magnitude of the applied electric current to the controller 30.

The controller 30 is mounted on the body frame 1 along with a power supply (not illustrated) or other electronic devices (not illustrated). The controller 30 performs control of the electric assist cart 100 and is a microcomputer having a central processing unit (CPU), a read-only memory (ROM), a random access memory (RAM), and an input/output (I/O) interface. The RAM stores data for the processing of the CPU, and the ROM stores a control program or the like of the CPU in advance. The I/O interface is used to input or output information from/to a connected device. Control of the electric assist cart 100 is implemented by operating the CPU or the RAM based on the program stored in the ROM.

The controller 30 is operated based on the power supplied from the power supply. When a voltage of the power supply abruptly decreases, the controller 30 stops overall control and sets the CPU to a sleep state. Assuming that a battery of 24 V is used as the power supply, the CPU is set to the sleep state, for example, when the voltage drops to, approximately, 18 V. As a result, it is possible to protect the controller 30 from an abrupt drop of the voltage of the power supply.

The controller 30 performs control such that the assisting forces for the left and right electric motors 15 are generated depending on the driving torque detected by the left and right torque sensors 6 in order to the move the electric assist cart 100 forward or backward and apply an assisting force in a straight movement, a turning movement, and a curve movement.

The controller 30 drives the electric motor 15 on a pulse width modulation (PWM) control basis. The controller 30 has a pair of electric current detection parts 15a for detecting an electric current value flowing through the left and right electric motors 15 in practice. As a result, it is possible to perform a feedback control for the electric motor 15.

Figure 4:
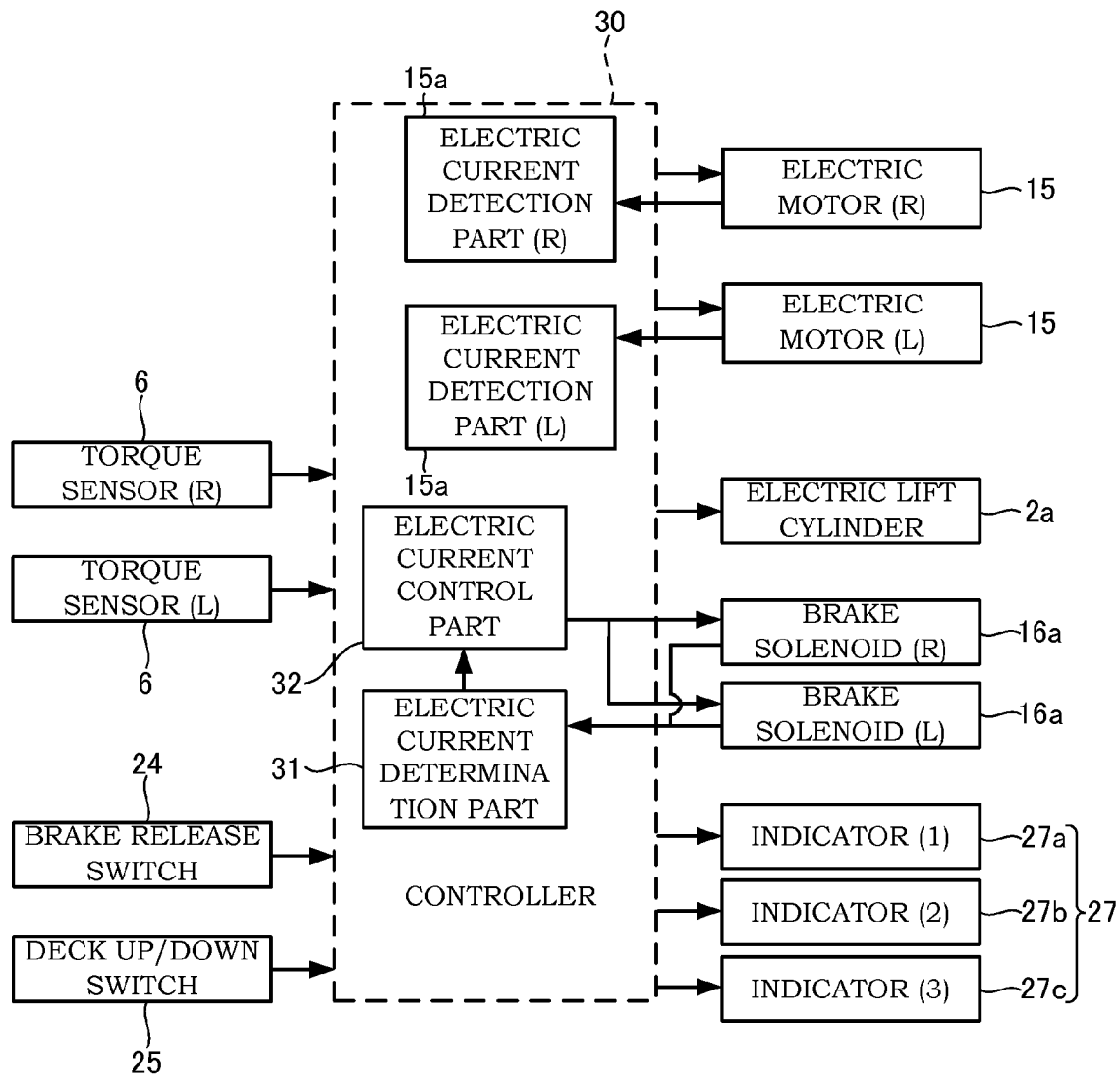
FIG. 4 is a control block diagram of the electric assist cart.

As illustrated in FIG. 4, the controller 30 has an electric current determination part 31 that determines a magnitude of the electric current flowing to the electric motor 15 and a time (continuous time) for flowing the electric current and an electric current control part 32 that stops or restricts supply of the electric current to the electric motor 15 based on the determination of the electric current determination part 31.

The console 29 is arranged on the rear face of the erected portion 1c of the body frame 1 as illustrated in FIG. 1. The console 29 is electrically connected to the controller 30. The position of the console 29 is not particularly limited if the console 29 is provided in a position where an operator can manipulate and see it. The console 29 includes: a brake release switch 24 for switching the brake solenoid 16a; a deck up/down switch 25 for controlling the electric lift cylinder 2a; and an indicator 27 that can display various failure modes.

The brake release switch 24 is a switch capable of switching the brake solenoid 16a based on an operator's manipulation. As an operator manipulates the brake release switch 24, the controller 30 instructs a predetermined electric current to flow to the brake solenoid 16a, and the drive wheel 11 switches to an unbraking state. As a result, the electric assist cart 100 can travel.

The deck up/down switch 25 is a switch for operating the electric lift cylinder 2a based on an operator's manipulation. As an operator manipulates the deck up/down switch 25, the electric lift cylinder 2a expands or contracts. As a result, the deck 3 is lifted or lowered against the body frame 1.

The indicator 27 indicates a state that a part of the functions stop in order to allow an operator to recognize it for a fail-safe capability in the electric assist cart 100. The indicator 27 includes a first indicator 27a, a second indicator 27b, and a third indicator 27c.

The first indicator 27a indicates the most insignificant failure mode. The first indicator 27a is turned on when the maximum value of the electric current supplied to the electric motor 15 is restricted. A state that the first indicator 27a is turned on is a first failure mode.

The second indicator 27b indicates the less insignificant failure mode than that of the first indicator 27a. The second indicator 27b is turned on when supply of the electric current to the electric motor 15 stops, or supply of the electric current to the electric lift cylinder 2a stops. A state that the second indicator 27b is turned on is a second failure mode.

The third indicator 27c indicates the most significant failure mode. The third indicator 27c is turned on when overall functions of the electric assist cart 100 stop. That is, while the third indicator 27c is turned on, supply of the electric current to the electric motor 15 and the electric lift cylinder 2a stops, and supply of the electric current to the brake solenoid 16a stops in the electric assist cart 100. Therefore, the brake 16 switches to the braking state. A state that the third indicator 27c is turned on is a third failure mode.

The first and the second failure modes are set only when the electric assist cart 100 does not enter any failure mode, and a capacity of the power supply remains such that overall functions of the electric assist cart 100 can be controlled. The third failure mode is set only when the electric assist cart 100 does not enter the second failure mode, and a capacity of the power supply remains such that an excitation electric current capable of switching the brake solenoid 16a can be generated. In addition, each failure mode is released by cutting off the power of the electric assist cart 100 once and reactivating it.

Next, a driving operation of the electric assist cart 100 will be described.

When an operator pushes the control handle 5 with both hands in parallel, the electric assist cart 100 moves forward straightly. In this case, the driving force input to the body frame 1 by pushing the control handle 5 is approximately equal between the left and right sides of the control handle 5. Therefore, the driving torques detected by left and right torque sensors 6 are also approximately equal to each other.

If the left and right torque sensors 6 detect an equal driving torque, the controller 30 instructs that the assisting force is equally applied to the left and right driving wheels 11 from the left and right electric motors 15. As a result, the assisting force is equally applied to the left and right drive wheels 11.

Therefore, the electric assist cart 100 moves forward straightly by virtue of the assisting force of the electric motor 15 in addition to the driving force applied by an operator.

It is noted that, when the electric assist cart 100 moves backward straightly, the pushing direction of the control handle 5 and the rotation direction of the electric motor 15 are reversed, and other actions are similar to those of the case where the electric assist cart 100 moves forward straightly.

Meanwhile, when an operator applies the pushing force to the control handle 5 differently between the left and right sides, the electric assist cart 100 turns left or right. In this case, the assisting force is differently applied to the left and right drive wheels 11 from the left and right electric motors 15.

Specifically, for example, when the electric assist cart 100 turns left, the pushing force applied to the control handle 5 by a right hand of an operator is stronger than the pushing force applied to the control handle 5 by a left hand of an operator. Therefore, the driving torque detected by the right torque sensor 6 is higher than the driving torque detected by the left torque sensor 6.

As a result, the controller 30 instructs that the assisting force applied from the right electric motor 15 to the drive wheel 11 is stronger than the assisting force applied from the left electric motor 15 to the drive wheel 11. As a result, the assisting force applied to the right drive wheel 11 becomes relatively stronger than the assisting force applied to the left drive wheel 11.

It is noted that the magnitude of the assisting force can be controlled depending on the pushing force applied by an operator to the control handle 5 because the left and right torque sensors 6 can detect the driving torque steplessly.

Figure 5:
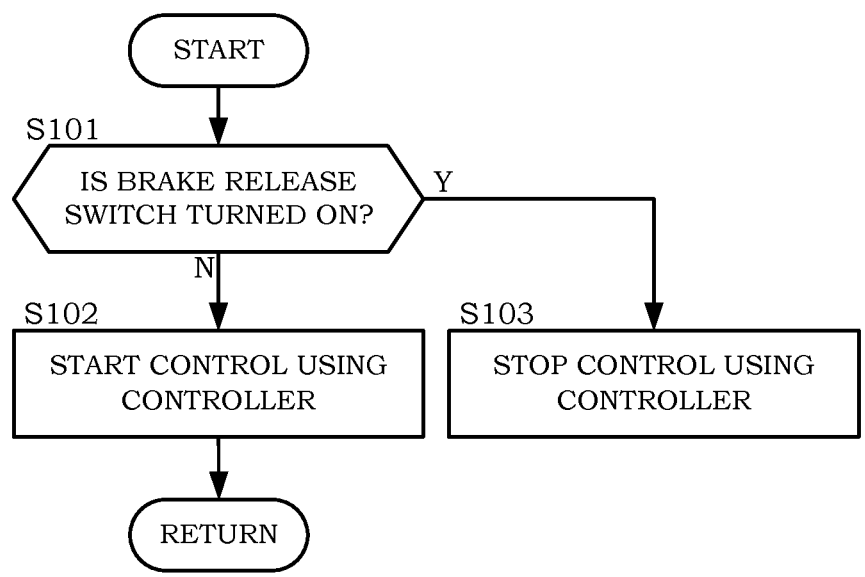
FIG. 5 is a flowchart illustrating control performed when the electric assist cart starts to operate.

Next, a control operation for starting the electric assist cart 100 will be described with reference to FIG. 5.

In steps S101 to S103, a start-up routine immediately after power is supplied to the controller 30 is executed.

In step S101, it is determined whether or not the brake release switch 24 is manipulated. If it is determined in step S101 that the brake release switch 24 is not manipulated, the process advances to step S102. Otherwise, if it is determined in step S101 that the brake release switch 24 is manipulated, the process advances to step S103.

In step S102, the controller 30 starts the control operation. As a result, the electric assist cart 100 can travel by virtue of the driving force of an operator and the assisting force of the electric motor 15. As the controller 30 starts the control operation in step S102, the process returns.

In step S103, the control operation of the controller 30 stops. As a result, even when the brake release switch 24 is manipulated, the controller 30 does not output an instruction for flowing an electric current to the brake solenoid 16a. Therefore, the brake 16 remains in the braking state even when the brake release switch 24 is manipulated without turning on power, and power is then turned on.

Therefore, the controller 30 maintains the braking state of the brake 16 even when power is turned on while the brake release switch 24 is manipulated. Therefore, the brake 16 does not switch to the unbraking state as soon as the power of controller 30 is turned on. Therefore, it is possible to improve safety of the electric assist cart 100.

It is noted that a fact that the operation of the controller 30 stops, and the braking state of the brake 16 is maintained is notified to an operator by turning on the first to third indicators 27a, 27b, and 27c at the same time. The first to third indicators 27a, 27b, and 27c serve as a notification device. The notification device is not limited to such a configuration, but any other configuration may be employed if a fact that the operation of the controller 30 stops is notified to an operator in a visual or auditory sense.

As a result, a user can recognize a fact that power is turned on while the brake release switch 24 is manipulated. The state that the control operation of the controller 30 stops is released as a user switches to a state that the brake release switch 24 is not manipulated, and a restart operation is performed.

Next, a fail-safe operation in the electric assist cart 100 will be described with reference to FIG. 6.

In step S201, it is determined whether or not the brake release switch 24 is manipulated. If it is determined in step S201 that the brake release switch 24 is manipulated, the process advances to step S202. Meanwhile, if it is determined in step S201 that the brake release switch 24 is not manipulated, the process returns.

In step S202, the electric current values of the left and right brake solenoids 16a are read to the controller 30.

In steps S203 and S204, a part of the functions of the electric assist cart 100 stops when an electric current excessively flows to the brake solenoid 16a over a normal use range.

In step S203, the electric current determination part 31 determines whether or not an electric current having a magnitude equal to or larger than a first setting value flows to any one of the left and right brake solenoids 16a. In this case, the first setting value is set to be larger than the maximum value of the electric current normally supplied to the brake solenoid 16a. For example, the first setting value is set to 2.0 [A] when an excitation current flowing to the brake solenoid 16a in a normal use is set to 1.5 [A].

If it is determined in step S203 that the electric current flowing to the brake solenoid 16a is equal to or larger than the first setting value, the process advances to step S204. Meanwhile, if it is determined in step S203 that the electric current value flowing to the brake solenoid 16a is smaller than the first setting value, the process advances to step S206.

In step S204, the electric current determination part 31 determines whether or not the electric current equal to or larger than the first setting value determined in step S203 continuously flows for a first setting time. In this case, the first setting time is set to a time for which the brake solenoid 16a can be protected when the electric current having a magnitude equal to or larger than the first setting time flows. Since the first setting time is a time for which an excessive electric current having a magnitude that does not flow in a normal use flows, the first setting time is set to a very short time. For example, the first setting time is set to 50 [ms].

If it is determined in step S204 that the electric current equal to or larger than the first setting value continuously flows for the first setting time, the process advances to step S205, and the mode switches to the third failure mode.

In step S205, the electric current control part 32 stops output of the electric current to the left and right brake solenoids 16a. In this case, the electric current control part 32 stops output of the electric current to both the left and right brake solenoids 16a even when the electric current equal to or larger than the first setting value continuously flows to any one of the brake solenoids 16a for the first setting time. As a result, both the left and right brakes 16 have the braking state.

In the third failure mode, the supply of the electric current to the brake solenoid 16a stops. Therefore, the brake 16 switches to the braking state, and the supply of the electric current to the electric motor 15 and the electric lift cylinder 2a stops. As a result, it is possible to prevent an operator from moving the electric assist cart 100 while an excessive electric current flows to the brake solenoid 16a that switches the braking state of the brake 16. In addition, by turning on the third indicator 27c, it is possible to notify an operator of a fact that the electric assist cart 100 has the third failure mode. Therefore, it is possible to improve safety of the electric assist cart 100.

Meanwhile, if it is determined in step S204 that the continuous time for which the electric current equal to or larger than the first setting value continuously flows is shorter than the first setting time, the process advances to step S206.

In steps S206 and S207, a part of the functions of the electric assist cart 100 stop when the electric current does not flow to the brake solenoid 16a as instructed from the controller 30.

In step S206, the electric current determination part 31 determines whether or not the electric current having a magnitude equal to or smaller than a second setting value flows to any one of the left and right brake solenoids 16a. In this case, the second setting value is set to be smaller than the minimum value of the electric current at which the brake solenoid 16a can switch the brake 16 from the unbraking state to the braking state. For example, the second setting value is set to 0.1 [A] when the minimum value of the electric current at which the brake solenoid 16a can switch is set to 0.5 [A].

If it is determined in step S206 that the electric current value flowing to the brake solenoid 16a is equal to or smaller than the second setting value, the process advances to step S207. Meanwhile, if it is determined in step S206 that the electric current value flowing to the brake solenoid 16a is larger than the second setting value, the process returns.

In step S207, the electric current determination part 31 determines whether or not the electric current equal to or smaller than the second setting value determined in step S206 continuously flows for a second setting time. In this case, the second setting time is set to be longer than the first setting time. For example, the second setting time is set to 1 [s].

If it is determined in step S207 that the time for which the electric current equal to or larger than the second setting value continuously flows is equal to or longer than the second setting time, the process advances to step S205, and the mode switches to the third failure mode.

In this manner, when the electric current does not flow to the brake solenoid 16a as instructed from the controller 30, the supply of power to the left and right brake solenoids 16a stops, and the third indicator 27c is turned on. Therefore, it is possible to prevent a state that the electric current does not flow to the brake solenoid 16a from being continuously maintained and notify an operator of a fact that the electric assist cart 100 enters the third failure mode. Therefore, it is possible to improve safety of the electric assist cart 100.

Meanwhile, if it is determined in step S207 that the continuous time for which the electric current equal to or larger than the second setting value continuously flows is shorter than the second setting time, the process returns.

According to the aforementioned embodiment, the following effects can be obtained.

The controller 30 does not output an instruction for flowing the electric current to the brake solenoid 16a even when the brake release switch 24 is manipulated without turning on power, and power is then turned on in this state. Therefore, the brake 16 remains in the braking state. That is, the brake 16 does not switch to the unbraking state as soon as power is supplied to the controller 30. As a result, it is possible to improve safety of the electric assist cart 100.

Embodiments of this invention were described above, but the above embodiments are merely examples of applications of this invention, and the technical scope of this invention is not limited to the specific constitutions of the above embodiments.

Figure 6:
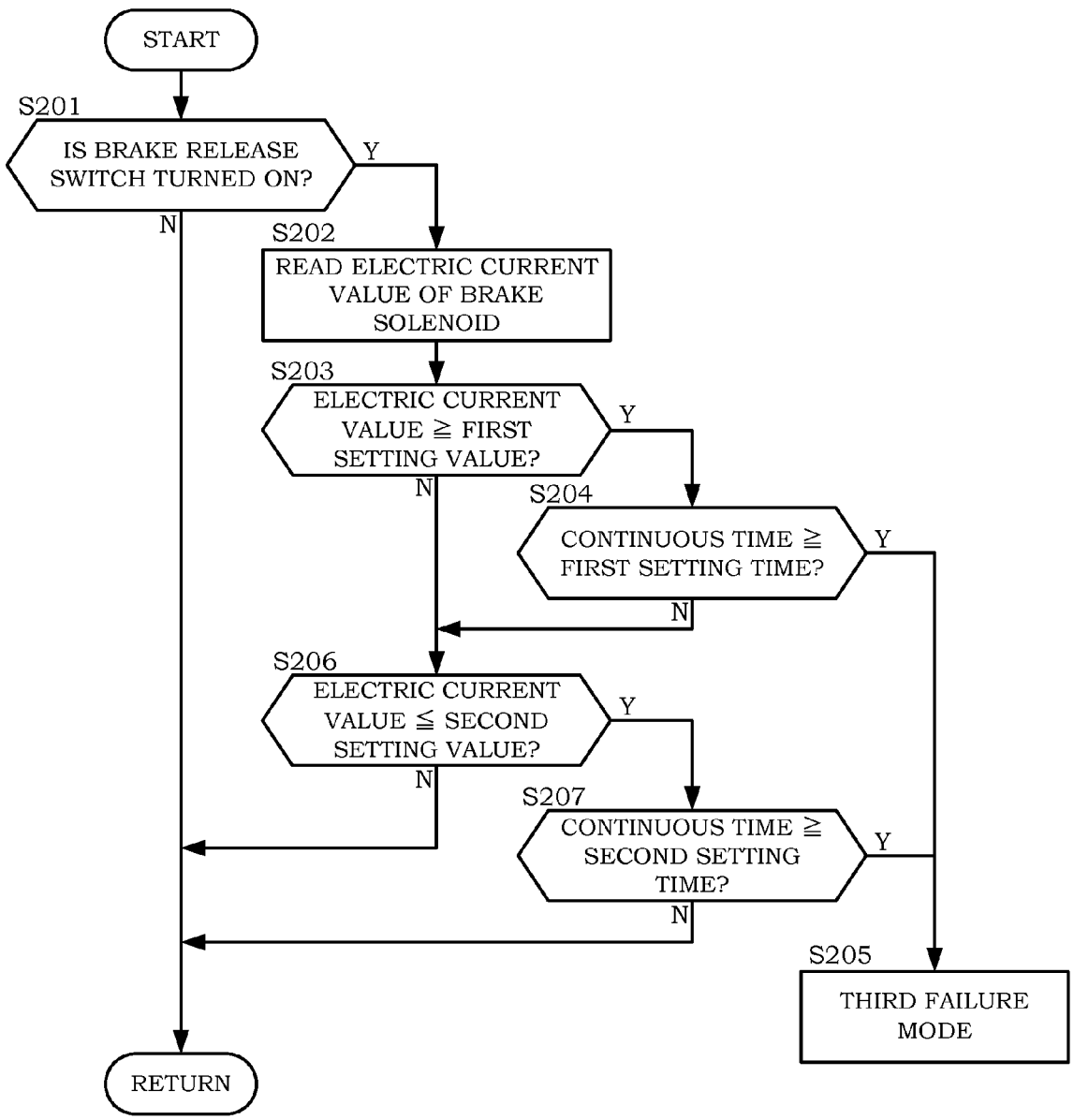
FIG. 6 is a flowchart illustrating a fail-safe operation of the electric assist cart.

For example, in the flowchart of FIG. 6, two different failure states are detected, and the control for determining a corresponding failure mode is executed through a single flow. Instead, a control operation for detecting every single failure state may be executed through an independent flow, and a flow may be further provided for determining the failure mode if there is a failure state in any one of the detection results.

This application claims priority based on Japanese Patent Application No. 2011-225975 filed with the Japan Patent Office on Oct. 13, 2011, the entire contents of which are incorporated into this specification.

The embodiments of this invention in which an exclusive property or privilege is claimed are defined as follows:

The invention claimed is:

1. An electric assist cart that can travel by applying an assisting force in addition to a driving force applied by an operator, comprising:
    a body frame where a burden can be loaded;
    a drive wheel provided in the body frame;
    a handling portion pushed and handled by an operator to input a driving force to the body frame;
    a torque detection part that is configured to detect a driving torque applied to the body frame by pushing and handling the handling portion;
    a controller that is configured to compute an assisting force applied to the drive wheel based on the driving torque detected by the torque detection part;
    an electric motor that is configured to apply the assisting force computed by the controller to the drive wheel;
    a brake that is configured to brake the drive wheel and switches from a braking state to an unbraking state when a predetermined electric current flows; and
    a brake release switch manipulated by an operator to allow the controller to instruct the predetermined electric current to flow to the brake,
    wherein the controller maintains the braking state of the brake even when the brake release switch is manipulated without turning on power, and power is then turned on.

2. The electric assist cart according to claim 1, further comprising a notification device that is configured to notify an operator of a fact that the controller maintains the braking state of the brake.

3. The electric assist cart according to claim 1, wherein the brake has a brake solenoid that is operated by receiving a predetermined electric current and switches the brake to an unbraking state when the brake release switch is manipulated by an operator.

4. The electric assist cart according to claim 3, wherein the controller includes
    an electric current determination part that is configured to determine whether or not an electric current having a magnitude equal to or larger than a first setting value flows to the brake solenoid for a first setting time while the brake release switch is manipulated, and
    an electric current control part that is configured to stop supply of an electric current to the brake solenoid based on determination of the electric current determination part.

5. The electric assist cart according to claim 4, wherein the first setting value is set to be larger than a maximum value of an electric current normally supplied to the brake solenoid, and
    the first setting time is set to a time for which the brake solenoid can be protected when an electric current having a magnitude equal to or larger than the first setting value flows.

6. The electric assist cart according to claim 4, wherein the controller includes
    an electric current determination part that is configured to determine whether or not an electric current having a magnitude equal to or smaller than a second setting value continuously flows to the brake solenoid while the brake release switch is manipulated by an operator, and
    an electric current control part that is configured to stop supply of an electric current to the brake solenoid based on determination of the electric current determination part.

7. The electric assist cart according to claim 6, wherein the second setting value is set to be smaller than a minimum value of an electric current at which the brake solenoid can switch the brake from an unbraking state to a braking state, and
    the second setting time is set to be longer than the first setting time.

* * * * *